(12) United States Patent
Momcilovich et al.

(10) Patent No.: US 9,705,353 B2
(45) Date of Patent: Jul. 11, 2017

(54) METHOD AND SYSTEM FOR HEATING TRACTION BATTERY OF ELECTRIC VEHICLE

(75) Inventors: Paul Theodore Momcilovich, Tecumseh, MI (US); Bruce Carvell Blakemore, Plymouth, MI (US); Allan Roy Gale, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1018 days.

(21) Appl. No.: 13/546,173

(22) Filed: Jul. 11, 2012

(65) Prior Publication Data

US 2014/0015450 A1 Jan. 16, 2014

(51) Int. Cl.
*H02P 1/00* (2006.01)
*H02J 7/14* (2006.01)
(Continued)

(52) U.S. Cl.
CPC .............. *H02J 7/1446* (2013.01); *B60L 7/14* (2013.01); *B60L 11/14* (2013.01);
(Continued)

(58) Field of Classification Search
CPC ..... H02P 6/10; H02P 6/14; H02P 6/08; B62D 5/046; H02K 29/08; B60W 10/26; B60W 20/00; B60W 10/08; B60W 10/06; B60W 2510/083; B60W 2710/083; Y02T 10/7005; Y02T 10/7077; Y02T 10/6226; Y02T 10/705; Y02T 10/642; Y02T 10/6278; Y02T 10/7055; Y02T 90/34; B60K 6/485; B60L 11/1803; B60L 11/1892; B60L 11/1894; B60L 2250/10; B60L 11/1875; B60L 2240/443; B60L 2240/545; B60L 11/187; B60L 2240/445; B60L 11/86; B60H 1/2225; B60H 1/2218; B60S 1/3805; F24H 3/0429; F24H 9/1872; F24H 2240/01; H02J 7/0031; H02J 7/0047; H02J 7/0091; H02J 7/1453; Y02E 60/12; Y02E 60/50; G01R 31/3648; G01R 31/3662;
(Continued)

(56) References Cited

U.S. PATENT DOCUMENTS 6,078,163 A * 6/2000 Horie et al. .................. 320/134
6,408,968 B1 * 6/2002 Wakashiro et al. ........ 180/65.26
(Continued)

FOREIGN PATENT DOCUMENTS

WO WO 2011070848 A1 * 6/2011

OTHER PUBLICATIONS

Chinese Patent Office, First Chinese Office Action for corresponding Chinese Patent Application No. 201310244831.9 dated May 5, 2016.

*Primary Examiner* — Jorge L Carrasquillo
(74) *Attorney, Agent, or Firm* — David B. Kelley; Brooks Kushman P.C.

(57) ABSTRACT

An electric vehicle such as a hybrid electric vehicle (HEV), a plug-in hybrid electric vehicle (PHEV), and a battery-only electric vehicle (BEV) includes a traction battery. A torque command is generated for a motor such that a traction battery electrically connected therewith outputs a discharge current having an alternating current (AC) component to cause a temperature of the traction battery to increase.

15 Claims, 2 Drawing Sheets

(51) Int. Cl.
  *H01M 10/44* (2006.01)
  *B60L 7/14* (2006.01)
  *B60L 11/14* (2006.01)
  *B60L 11/18* (2006.01)
  *B60L 15/20* (2006.01)

(52) U.S. Cl.
  CPC ....... *B60L 11/1861* (2013.01); *B60L 11/1872* (2013.01); *B60L 15/2009* (2013.01); *B60L 15/2054* (2013.01); *H01M 10/443* (2013.01); *B60L 2210/40* (2013.01); *B60L 2240/12* (2013.01); *B60L 2240/421* (2013.01); *B60L 2240/423* (2013.01); *B60L 2240/486* (2013.01); *B60L 2240/507* (2013.01); *B60L 2240/545* (2013.01); *B60L 2240/547* (2013.01); *B60L 2240/549* (2013.01); *B60L 2250/26* (2013.01); *H01M 2220/20* (2013.01); *Y02T 10/645* (2013.01); *Y02T 10/70* (2013.01); *Y02T 10/705* (2013.01); *Y02T 10/7005* (2013.01); *Y02T 10/7044* (2013.01); *Y02T 10/7077* (2013.01); *Y02T 10/7241* (2013.01); *Y02T 10/7275* (2013.01); *Y02T 10/92* (2013.01); *Y02T 90/14* (2013.01)

(58) Field of Classification Search
  CPC ............. H01M 10/48; H01M 10/5016; H01M 10/5006; H01M 8/04537; H01M 8/04858; B60Y 2200/91; F02N 11/0862; F02N 2200/064
  USPC ......... 318/139, 400.23; 180/65.3, 65.2, 65.8, 180/65.26; 219/202; 320/136
  See application file for complete search history.

(56) References Cited

U.S. PATENT DOCUMENTS

| | | |
|---|---|---|
| 2006/0152085 A1 | 7/2006 | Flett et al. |
| 2010/0185405 A1* | 7/2010 | Aoshima et al. ............... 702/63 |
| 2010/0270976 A1* | 10/2010 | Tamura ........................ 320/136 |
| 2011/0074326 A1 | 3/2011 | Su |
| 2011/0270558 A1* | 11/2011 | Knezevic et al. .............. 702/65 |
| 2012/0200241 A1* | 8/2012 | Kojima et al. ................ 318/139 |
| 2012/0245781 A1* | 9/2012 | Kanamori et al. ............. 701/22 |
| 2012/0261397 A1* | 10/2012 | Schwarz et al. ............. 219/202 |
| 2012/0280660 A1* | 11/2012 | Aga et al. ..................... 320/134 |

* cited by examiner

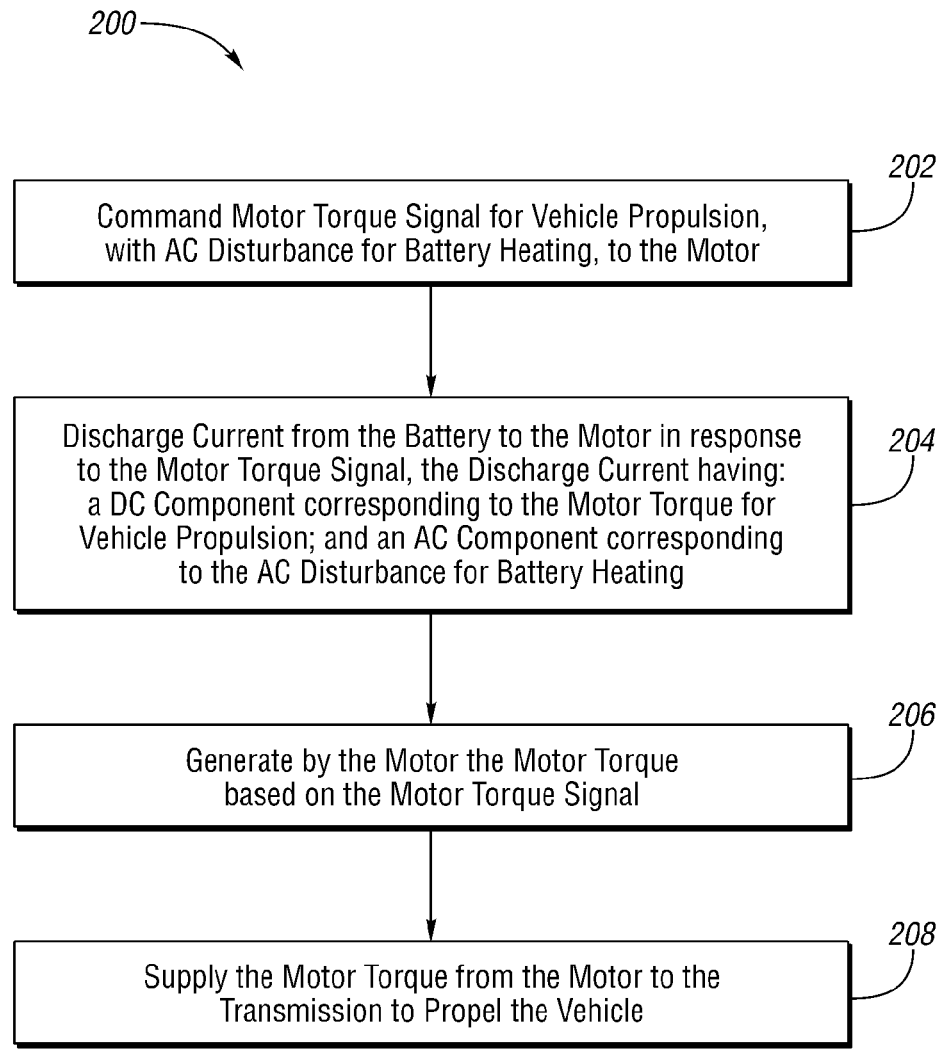

METHOD AND SYSTEM FOR HEATING TRACTION BATTERY OF ELECTRIC VEHICLE

TECHNICAL FIELD

The present invention relates to heating the traction battery of an electric vehicle.

BACKGROUND

An electric vehicle such as a hybrid electric vehicle (HEV), a plug-in hybrid electric vehicle (PHEV), and a battery-only electric vehicle (BEV) has an electric motor and a traction battery. The motor is interposed between the battery and a drive shaft of the vehicle, wherein the motor is coupled to the driveline of the vehicle. The motor may be controlled to use energy from the battery to contribute positive wheel torque to the wheels of the vehicle in order to propel the vehicle.

Conversely, the motor may be controlled to contribute negative wheel torque to the wheels for vehicle braking. During a process referred to as regenerative braking, charging the battery during vehicle deceleration collects the kinetic energy stored in the braking vehicle. During regenerative braking, required wheel braking torque is allocated between friction brakes and the motor, which acts as a generator to charge the battery.

The capability of a typical traction battery to collect regenerative braking energy becomes limited as the temperature of the battery falls and is especially noticeable below freezing. A method for heating the battery in order to overcome this reduction in collection capability involves cycling energy into and out of the battery. However, at relatively low temperatures relatively little energy can be put back into the battery. In this case, the discharge current provides all of the battery heating.

SUMMARY

An embodiment of the present invention provides a method which includes generating a torque command for a motor such that a traction battery electrically connected therewith outputs a discharge current having an alternating current (AC) component to cause a temperature of the traction battery to increase.

The discharge current may further include a current component for vehicle propulsion. The current component for vehicle propulsion may be a direct current (DC) component. The AC component causes the temperature of the battery to increase faster than the current component for vehicle propulsion. In an embodiment, the AC component has a frequency between 0 Hz and 300 Hz.

The method may further include converting the current component for vehicle propulsion into a mechanical torque and supplying the mechanical torque to a transmission to propel the vehicle.

The method may further include modifying the torque command to decrease the AC component as the temperature of the battery increases.

An embodiment of the present invention provides a vehicle having a motor, a traction battery electrically connected with the motor, and a controller. The controller is configured to modulate a torque command for the motor such that the traction battery outputs a discharge current having an alternating current (AC) component to cause a temperature of the traction battery to increase.

An embodiment of the present invention provides a vehicle having a transmission, a motor, and a traction battery. The traction battery is configured to output a discharge current to the motor. In response to the discharge current, the motor generates a motor torque for the transmission to propel the vehicle. The discharge current includes, in addition to a current component for vehicle propulsion, an alternating current (AC) component that causes a temperature of the traction battery to increase.

BRIEF DESCRIPTION OF THE DRAWINGS

FIG. 2 illustrates a flowchart describing operation of a method and system for modifying the DC load of the traction battery to include an AC component for heating the battery in accordance with an embodiment of the present invention.

DETAILED DESCRIPTION

Figure 1:
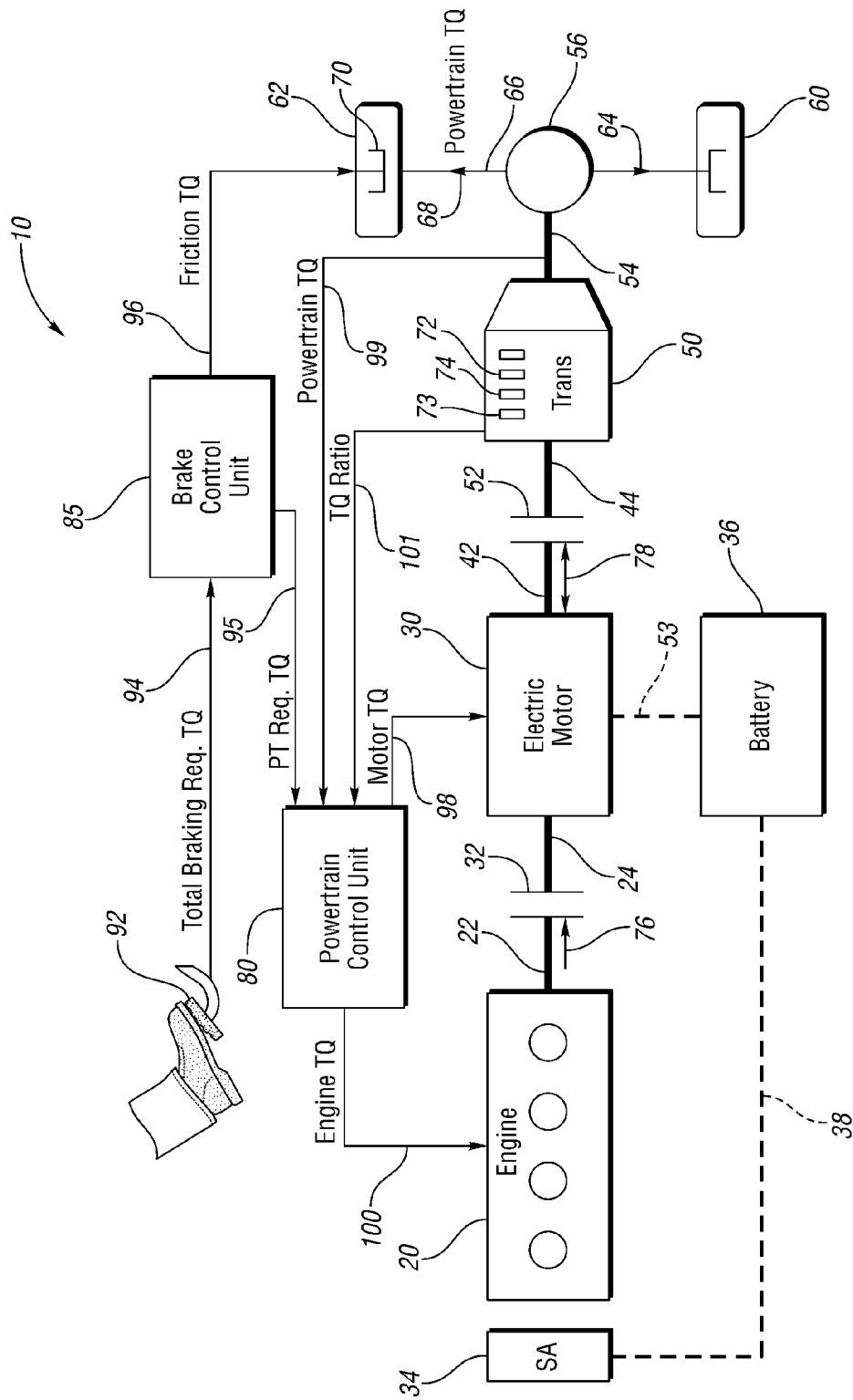
FIG. 1 illustrates a block diagram of an exemplary hybrid vehicle powertrain in accordance with an embodiment of the present invention.

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIG. 1, a block diagram of an exemplary powertrain system 10 for a hybrid electric vehicle (HEV) in accordance with an embodiment of the present invention is shown. Powertrain system 10 includes an engine 20, an electric machine such as an electric motor/generator 30 ("motor"), a multiple-ratio automatic transmission 50, and a friction braking system.

Engine 20 has an output shaft 22 connectable to and dis-connectable from an input shaft 24 of motor 30 through an engine clutch 32 (i.e., a disconnect clutch 32). Motor 30 has an output shaft 42 connectable to and dis-connectable from an input shaft 44 of transmission 50 through a motor clutch 52 (i.e., a launch clutch 52). Although clutches 32, 52 are described and illustrated as hydraulic clutches, other types of clutches such as electro-mechanical clutches may be used.

Transmission 50 includes multiple gear ratios and is connected to a drive shaft 54 (i.e., an output shaft of transmission 50). Output shaft 54 is connected to a differential 56. Left and right drive wheels 60, 62 are connected to differential 56 through left and right axles 64, 66. With this arrangement, transmission 50 transmits a powertrain output torque 68 to drive wheels 60, 62. Wheels 60, 62 are provided with friction brakes 70 for applying a braking force to slow the vehicle.

Starter motor 34 is connected to a traction battery 36 through wiring 38 so as to be also used as a generator to produce electric energy for storage in battery 36. When running, engine 20 can provide power to starter motor 34 so that starter motor 34 generates electric energy for storage in battery 36. Motor 30 is also linked to battery 36 through wiring 53.

Engine 20 is a primary source of power for powertrain system 10 and battery 36 is a secondary source of power for powertrain system 10. Engine 20 is an internal combustion engine such as a gasoline, diesel, or natural gas powered engine. Engine 20 generates a first input torque 76 (i.e., an engine torque) that is supplied to motor 30 when engine 20 and motor 30 are connected via engine clutch 32. To drive the vehicle with engine 20, at least a portion of first input torque 76 passes from engine 20 through engine clutch 32 to motor 30 and then from motor 30 through motor clutch 52 to transmission 50. Engine 20 also provides power through engine clutch 32 to motor 30 so that motor 30 can act as a generator and produce electric energy for storage in battery 36.

Depending on the particular operating mode of the vehicle, motor 30 either sends power to battery 36 or converts electric energy stored in battery 36 into a second input torque 78 (i.e., a motor torque). Second input torque 78 is also sent to transmission 50 through motor clutch 52. When generating electrical power for storage in battery 36, motor 30 obtains power either from engine 20 in a driving mode or from the inertia in the vehicle as motor 30 acts as a brake in what is referred to as a regenerative braking mode.

As described, engine 20, engine clutch 32, motor 30, motor clutch 52, and transmission 50 are connectable sequentially in series as illustrated in FIG. 1. As such, powertrain system 10 represents a parallel or modular hybrid transmission ("MHT") configuration in which engine 20 is connected to motor 30 by engine clutch 32 with motor 30 being connected to transmission input shaft 44 by motor clutch 52.

Depending on whether engine clutch 32 and motor clutch 52 are engaged or disengaged determines which input torques 76 and 78 are transferred to transmission 50. For example, if engine clutch 32 is disengaged, then only second input torque 78 from motor 30 is supplied to transmission 50. If both clutches 32, 52 are engaged, then both first and second input torques 76, 78 from engine 20 and motor 30, respectively, are supplied to transmission 50. Of course, if input torque for transmission 50 is only desired from engine 20, both clutches 32 and 52 are engaged, but motor 30 is not energized, such that first input torque 76 from engine 20 is only supplied to transmission 50. Powertrain output torque 68 corresponds to the summation of engine torque 76 and motor torque 78 supplied to transmission 50.

Transmission 50 includes several planetary gear sets (not shown) that are selectively placed in different gear ratios by selective engagement of a plurality of friction elements in order to establish the desired multiple drive ratios. For instance, the friction elements of transmission 50 can be constituted by an on-coming friction element 72 (i.e., an on-coming clutch ("OCC")), an off-going friction element 73 (i.e., an off-going clutch ("OGC")), and a forward clutch 74. The friction elements of transmission 50 are controllable through a shift schedule that connects and disconnects certain elements of the planetary gear sets of transmission 50 to control the ratio between the transmission output and the transmission input.

Transmission 50 is automatically shifted from one ratio to another based on the needs of the vehicle. Transmission 50 then provides powertrain output torque 68 to output shaft 54. Powertrain output torque 68 ultimately drives drive wheels 60, 62. The kinetic details of transmission 50 can be established by a wide range of transmission arrangements. Transmission 50 is an example of a transmission arrangement for use with embodiments of the present invention. Any multiple ratio transmission that accepts input torque(s) from an engine and/or a motor and then provides torque to an output shaft at the different ratios is acceptable for use with embodiments of the present invention. This includes automatic and manual transmissions. For example, continuously variable, dual clutch, and infinitely variable transmissions are acceptable for use with embodiments of the present invention.

Powertrain system 10 further includes a powertrain control unit 80 and a brake control unit 85. Control units 80 and 85 collectively constitute a vehicle system controller. Based on repositioning a brake pedal 92, the driver of the vehicle provides a total braking torque requirement signal 94 when the driver wants to slow the vehicle. The more the driver depresses pedal 92, the more wheel braking torque is requested. Brake control unit 85 apportions the total wheel braking torque between a powertrain braking torque signal 95 (which represents the amount of torque to be obtained by regenerative braking) and a friction braking torque signal 96 (which represents the amount of torque to be obtained through friction brakes 70).

Brake control unit 85 provides friction braking torque signal 96 to friction brakes 70 for the friction brakes to apply the friction braking torque to the drive wheels. Brake control unit 85 provides powertrain braking torque signal 95 to powertrain control unit 80. In response, powertrain control unit 80 sends a motor torque signal 98 to motor 30 representing the requisite amount of motor torque to be provided by regenerative braking. In turn, motor 30 generates the regenerative braking torque and thereby supplies a negative input torque to transmission 50.

Powertrain control unit 80 receives torque ratio signals 101 from transmission 50 regarding shifting from one speed ratio to another, such as during a gear shift. Powertrain control unit 80 also receives a powertrain torque signal 99 representing an amount of total powertrain output torque 68.

In order to propel the vehicle, powertrain control unit 80 sends an engine torque signal 100 to engine 20 indicating how much engine torque is required at a given time. In response, engine 20 operates to generate engine torque 76 according to engine torque signal 100. Similarly, powertrain control unit 80 sends motor torque signal 98 to motor 30 indicating how much motor torque is required at a given time. In response, motor 30 operates to generate motor torque 78 according to motor torque signal 98. Powertrain output torque 68 corresponds to the summation of engine torque 76 and motor torque 78 supplied to transmission 50. When both clutches 32, 52 are engaged, both engine torque 76 and motor torque 78 are supplied to transmission 50. In this case, powertrain output torque 68 corresponds to the summation of engine torque 76 and motor torque 78.

Motor 30 obtains an electrical current discharged from battery 36 in order to generate motor torque 78. The discharge current for generating motor torque 78 is a direct current (DC) load of battery 36. Motor 30 converts the discharge current into a mechanical torque (i.e., motor torque 78).

The amount of discharge current from battery 36 corresponds to the amount of motor torque 78 to be generated. Of course, the discharge current from battery 36 at a fixed voltage of battery 36 is proportional to motor power (i.e., V*I=Power) and the motor power is the product of motor torque 78 and the speed of motor 30. As noted above, the amount of motor torque 78 to be generated is based on motor torque signal 98 from powertrain control unit 80. Thus, powertrain control unit 80 can control motor 30 to generate different motor torques 78 by obtaining correspondingly different discharge currents from battery 36. Powertrain control unit 80 controls motor 30 to generate different motor torques 78 by commanding correspondingly different motor torque signals 98 to motor 30.

The capability of battery 36 to collect regenerative braking energy becomes limited as the temperature of battery 36 falls below freezing. Control strategies in accordance with embodiments of the present invention add an alternating current (AC) component to the discharge current load of battery 36 in order to heat battery 36. That is, these control strategies modify the discharge current load of battery 36 to include an AC component for heating battery 36. For instance, the cells of battery 36 are heated. In one embodiment, powertrain control unit 80 adds an AC disturbance to motor torque signal 98 in order to add the AC component to the discharge current load of battery 36. That is, in this embodiment, the electric drive torque command is modified to include the AC disturbance. In one embodiment, the AC component is a low frequency AC component on the order between 0 Hz and 300 Hz.

As an example of adding an AC component to the discharge current of battery 36, a ten amp DC current draw on battery 36 is considered. If a ten amp peak-to-peak AC current draw is added to the DC current, then battery 36 will not experience a charge current. However, in this example, the average current draw will remain ten amps with a 12% increase in the battery I2R loss.

Referring now to FIG. 2, a flowchart 200 describing operation of a method and system for modifying the DC load of battery 36 to include an AC component for heating battery 36 in accordance with an embodiment of the present invention is shown. The operation occurs when the vehicle is being propelled with a powertrain output torque 68 based at least on motor torque 78. Engine torque 76 may or may not be being supplied to transmission 50 for propelling the vehicle during the operation.

The operation begins with powertrain control unit 80 generating a motor torque signal 98 in order to control motor 30 to generate a corresponding motor torque 78 for propelling the vehicle. In particular, powertrain control unit 80 generates motor torque signal 98 with an added AC component disturbance. As such, motor torque signal 98 includes a component indicative of a DC current load and a component indicative of an AC current load. The DC component corresponds to motor torque 78 to be generated for vehicle propulsion. The AC component corresponds to the added AC disturbance for battery heating. Without the added AC component disturbance, motor torque signal 98 would be a typical motor torque signal entirely indicative of the DC current load. Motor torque signal 98 for vehicle propulsion, with the added AC disturbance for battery heating, is commanded to motor 30 as shown in block 202.

In response to motor torque signal 98 being commanded from powertrain control unit 80 to motor 30, battery 36 discharges electrical current to motor 30 as shown in block 204. The discharge current includes the DC component corresponding to motor torque 78 to be generated for vehicle propulsion and the AC component corresponding to the added AC disturbance for heating battery 36.

Motor 30 generates motor torque 78 according to the commanded motor torque signal 98 as shown in block 206. Motor 30 supplies motor torque 78 via the engaged motor clutch 52 to transmission 50 in order to generate powertrain output torque 68 for propelling the vehicle as shown in block 208.

The AC component can be reduced over time as battery 36 heats up such that the discharge current is devoid or substantially devoid of the AC component once the temperature of battery 36 has increased to a sufficient threshold. Conversely, the AC component can be increased over time to account for battery 36 not being heated up within a sufficient amount of time.

As noted, powertrain output torque 68 is the summation of engine torque 76 and motor torque 78 when both torques 76, 78 are supplied to transmission 50. Accordingly, if needed, powertrain control unit 80 can control engine 20 in correspondence with the AC disturbance added to motor torque signal 98 in order to nullify any effects on motor torque 78 caused by the AC disturbance. This option is available as powertrain output torque 68 corresponds to the summation of engine torque 76 and motor torque 78 when both torques 76, 78 are supplied to transmission 50.

In another embodiment, motor 30 is operated as a generator to battery 36. In this embodiment, engine 20 provides power through engine clutch 32 to motor 30 such that motor 30 can act as a generator and produce electric energy for storage in battery 36. In this embodiment, the electric energy output of motor 30 to battery 36 is varied to add the AC disturbance for battery heating to the electric energy output. In this case, the typical electric energy output of motor 30 for battery 36 is modified with the added AC disturbance.

Embodiments of the present invention have applicability with Li-Ion batteries. Embodiments of the present invention take advantage of the characteristics that at low AC frequencies (e.g., between 0 Hz to 300 Hz) the temperature of a Li-Ion battery can be increased significantly faster than by simply discharging the battery with a DC current load or with relatively higher AC frequencies. The battery can be increased significantly faster as these low AC frequencies as the battery is most resistive at these low AC frequencies. Accordingly, adding an AC component with frequencies between 0 Hz and 300 Hz to the DC current draw of battery 36 can effectively reduce the amount of time to warm the battery. As a result, the capability of battery 36 to capture regenerative braking energy is increased. As described herein, adding this frequency component (or frequencies components) to the DC current draw from battery 36 can be accomplished by adding a disturbance to the current controller for the drive system.

With the added low frequency(s) disturbance added to the propulsion system, the time for the battery to reach a temperature that allows capture of regenerative braking energy can be reduced while providing full functionality of the vehicle to the vehicle operator. This reduced time may provide enhanced low temperature regenerative braking capture resulting in extended vehicle operating range. As described, a method of adding the low frequency or frequencies component to the DC current draw from battery 36 can be accomplished by adding a disturbance to the current controller for the drive system. This can be accomplished in various ways as known to those of ordinary skill in the art. One example of this is described in IEEE Vehicle Power and Propulsion Conference (VPPC), Sep. 3-5, 2008, Harbin, China 978-1-4244-1849-7/08 2008, IEEE Design & Implementation of a Novel Vector-Controlled Drive by Direct Injection of Random Signal, A. Zabihinejad and J. S. Moghani.

As described herein, powertrain system 10 is an example of a powertrain system for use with embodiments of the present invention. Powertrain system 10 represents a parallel hybrid electric vehicle configuration. Other hybrid electric vehicle powertrains may be used with embodiments of the present invention. Likewise, plug-in hybrid electric vehicle powertrains and battery-only electric vehicle powertrains may be used with embodiments of the present invention. In general, any electric vehicle having a motor interposed between a traction battery and a transmission may be used with embodiments of the present invention. Such electric vehicles may or may not include an engine.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method comprising:
generating a torque command for a motor such that a traction battery electrically connected therewith outputs to the motor a discharge current having (i) a direct current (DC) component for vehicle propulsion and (ii) an alternating current (AC) component, selected as a function of a temperature of the battery, to cause the temperature of the traction battery to increase.

2. The method of claim 1 wherein:
the AC component causes the temperature of the traction battery to increase faster than the current component for vehicle propulsion.

3. The method of claim 1 wherein:
the AC component has a frequency between 0 Hz and 300 Hz.

4. The method of claim 1 further comprising:
converting the current component for vehicle propulsion into a mechanical torque; and
supplying the mechanical torque to a transmission to propel the vehicle.

5. The method of claim 1 further comprising:
modifying the torque command to decrease the AC component as the temperature of the traction battery increases.

6. A vehicle comprising:
a motor;
a traction battery electrically connected with the motor; and
a controller configured to modulate a torque command for the motor such that the traction battery outputs to the motor a discharge current having (i) a direct current (DC) component for vehicle propulsion and (ii) an alternating current (AC) component, selected as a function of a temperature of the battery, to cause the temperature of the traction battery to increase.

7. The vehicle of claim 6 wherein:
the AC component causes the temperature of the traction battery to increase faster than the DC component.

8. The vehicle of claim 6 wherein:
the AC component has a frequency between 0 Hz and 300 Hz.

9. The vehicle of claim 6 wherein:
the controller is further configured to modify the modulated torque command to decrease the AC component as the temperature of the traction battery increases.

10. The vehicle of claim 6 wherein:
the vehicle is one of a hybrid electric vehicle, a plug-in hybrid electric vehicle, and a battery-only electric vehicle.

11. A vehicle comprising:
a transmission;
a motor; and
a traction battery configured to output a discharge current to the motor, wherein in response to the discharge current, the motor generates a motor torque for the transmission to propel the vehicle and wherein the discharge current includes, in addition to a direct current (DC) component for vehicle propulsion, an alternating current (AC) component, selected as a function of a temperature of the battery, that causes the temperature of the traction battery to increase.

12. The vehicle of claim 11 wherein:
the AC component has a frequency between 0 Hz and 300 Hz.

13. The vehicle of claim 11 further comprising:
a controller configured to generate a torque command for the motor such that the traction battery outputs the discharge current.

14. The vehicle of claim 11 wherein:
the AC component causes the temperature of the traction battery to increase faster than the current component for vehicle propulsion.

15. The vehicle of claim 11 wherein:
the vehicle is one of a hybrid electric vehicle, a plug-in hybrid electric vehicle, and a battery-only electric vehicle.

* * * * *